(12) United States Patent
Pankov (10) Patent No.: US 12,280,663 B2
(45) Date of Patent: Apr. 22, 2025

(54) SYSTEM FOR GENERATING AN ENERGY-EFFICIENT TRACK FOR A MOTOR VEHICLE (71) Applicant: Boris Valerevich Pankov, Moscow (RU)

(72) Inventor: Boris Valerevich Pankov, Moscow (RU)

( * ) Notice: Subject to any disclaimer, the term of this patent is extended or adjusted under 35 U.S.C. 154(b) by 0 days.

(21) Appl. No.: 17/687,883

(22) Filed: Mar. 7, 2022

(65) Prior Publication Data

US 2023/0280174 A1   Sep. 7, 2023

Related U.S. Application Data (63) Continuation of application No. 17/640,469, filed as application No. PCT/RU2020/050189 on Aug. 14, 2020.

(30) Foreign Application Priority Data

Sep. 4, 2019 (RU) ................................ 2019127894

(51) Int. Cl.
*B60K 31/00* (2006.01)
*B60W 40/06* (2012.01)
(Continued)

(52) U.S. Cl.
CPC ......... *B60K 31/0058* (2013.01); *B60W 40/06* (2013.01); *B60W 40/105* (2013.01);
(Continued)

(58) Field of Classification Search
CPC . B60K 31/0058; B60W 40/06; B60W 40/105; B60W 40/13; B60W 2555/20;
(Continued)

(56) References Cited

U.S. PATENT DOCUMENTS 5,781,119 A    7/1998   Yamashita et al.
6,226,588 B1   5/2001   Teramura et al.
(Continued)

FOREIGN PATENT DOCUMENTS

DE    102010029467    12/2011
EP    2477011         7/2012
(Continued)

OTHER PUBLICATIONS

Johannes Asamer et al.: "Sensitivity analysis for energy demand estimation of electric vehicles", https://www.sciencedirect.com/science/article/pii/S1361920915300250.
(Continued)

*Primary Examiner* — Peter D Nolan
*Assistant Examiner* — Wae L Louie
(74) *Attorney, Agent, or Firm* — Chad Peterson (57) ABSTRACT The proposed invention relates to methods for controlling energy consumption by a motor vehicle and can be used in transportation industry. The technical problem to be solved by the claimed invention is to provide a method, a device and a system that do not possess the drawbacks of the prior art and thus make it possible to generate an accurate energy-efficient track for a motor vehicle that allows to reduce energy consumption by the motor vehicle on the specific portion of the route. The objective of the claimed invention is to overcome the drawbacks of the prior art and thus to reduce energy consumption by the motor vehicle on the specific portion of the route.

8 Claims, 5 Drawing Sheets (51) Int. Cl.
  *B60W 40/105* (2012.01)
  *B60W 40/13* (2012.01)
  *G07C 5/00* (2006.01)
  *G07C 5/02* (2006.01)
  *G01C 21/34* (2006.01)

(52) U.S. Cl.
  CPC ............. *B60W 40/13* (2013.01); *G07C 5/008* (2013.01); *G07C 5/02* (2013.01); *B60W 2420/503* (2013.01); *B60W 2520/28* (2013.01); *B60W 2530/10* (2013.01); *B60W 2555/20* (2020.02); *B60W 2555/60* (2020.02); *B60W 2556/65* (2020.02); *G01C 21/3469* (2013.01)

(58) Field of Classification Search
  CPC ......... B60W 2555/60; B60W 2556/65; B60W 2420/503; B60W 2520/28; G07C 5/008; G07C 5/02
  See application file for complete search history.

(56) References Cited

U.S. PATENT DOCUMENTS

| | | | |
|---|---|---|---|
| 6,282,492 | B1 | 8/2001 | Gorai et al. |
| 9,294,733 | B2 | 3/2016 | Watanabe et al. |
| 9,342,983 | B1 | 5/2016 | Brener et al. |
| 9,346,466 | B2 | 5/2016 | Papajewski et al. |
| 9,566,896 | B2 | 2/2017 | Armenta et al. |
| 9,604,648 | B2 | 3/2017 | Tamari et al. |
| 9,631,940 | B2 | 4/2017 | Eikelenberg et al. |
| 9,725,093 | B2 | 8/2017 | Chunodkar et al. |
| 9,818,088 | B2 * | 11/2017 | Penilla ............... G01M 17/007 |
| 9,994,234 | B2 | 6/2018 | Oguri |
| 10,061,637 | B1 | 8/2018 | Halbersberg et al. |
| 10,176,783 | B2 | 1/2019 | Travers et al. |
| 10,269,260 | B2 | 4/2019 | Ellis |
| 10,495,477 | B2 | 12/2019 | Engelhardt |
| 10,504,052 | B2 | 12/2019 | Sugioka et al. |
| 10,594,991 | B1 * | 3/2020 | Skolnick ............... H04N 7/188 |
| 10,646,825 | B2 | 5/2020 | Kim |
| 10,930,159 | B1 | 2/2021 | Jessen et al. |
| 11,173,916 | B2 * | 11/2021 | Dodo ............... B60W 30/188 |
| 11,193,778 | B2 | 12/2021 | Verheijen et al. |
| 11,279,359 | B2 | 3/2022 | Plianos et al. |
| 11,390,165 | B2 * | 7/2022 | Koebler ............... G07C 5/085 |
| 11,518,393 | B2 * | 12/2022 | Liu ............... B60W 60/0013 |
| 11,738,750 | B2 * | 8/2023 | Wessel ............ B60W 30/18072 |
| | | | 701/93 |
| 11,760,208 | B2 * | 9/2023 | Kwon ............... B60L 15/2045 |
| | | | 701/22 |
| 2005/0154505 | A1 | 7/2005 | Nakamura et al. |
| 2007/0171093 | A1 | 7/2007 | Jang |
| 2008/0125958 | A1 | 5/2008 | Boss et al. |
| 2008/0133120 | A1 | 6/2008 | Romanick |
| 2009/0031741 | A1 | 2/2009 | Hara et al. |
| 2009/0281715 | A1 | 11/2009 | Paik |
| 2010/0057339 | A1 | 3/2010 | Pryakhin et al. |
| 2010/0253594 | A1 | 10/2010 | Szczerba et al. |
| 2010/0332373 | A1 * | 12/2010 | Crabtree ............... G06Q 40/04 |
| | | | 709/224 |
| 2011/0166774 | A1 | 7/2011 | Schunder |
| 2011/0208646 | A1 | 8/2011 | McMaster et al. |
| 2011/0313647 | A1 | 12/2011 | Koebler et al. |
| 2012/0004839 | A1 | 1/2012 | Mizuno |
| 2012/0022781 | A1 | 1/2012 | Wilson |
| 2012/0089327 | A1 | 4/2012 | Miura et al. |
| 2012/0123657 | A1 | 5/2012 | Taguchi |
| 2012/0271542 | A1 | 10/2012 | Arcot et al. |
| 2013/0054125 | A1 | 2/2013 | Bruemmer et al. |
| 2013/0173147 | A1 | 7/2013 | Takeuchi et al. |
| 2013/0261970 | A1 * | 10/2013 | Papajewski ......... G01C 21/3492 |
| | | | 701/542 |
| 2014/0032062 | A1 | 1/2014 | Baer et al. |
| 2014/0032087 | A1 | 1/2014 | Shiri |
| 2015/0019117 | A1 | 1/2015 | Huber et al. |
| 2015/0073692 | A1 | 3/2015 | Malikopoulos |
| 2015/0094968 | A1 * | 4/2015 | Jia ........................ G05B 15/02 |
| | | | 702/60 |
| 2015/0183439 | A1 | 7/2015 | Jackson |
| 2015/0232097 | A1 | 8/2015 | Luther et al. |
| 2015/0241234 | A1 | 8/2015 | Ogawa |
| 2016/0084661 | A1 | 3/2016 | Gautama et al. |
| 2016/0129836 | A1 | 5/2016 | Sugita et al. |
| 2016/0207521 | A1 | 7/2016 | Ogawa |
| 2016/0221567 | A1 | 8/2016 | Ogawa |
| 2017/0008467 | A1 | 1/2017 | Lindhuber |
| 2017/0038219 | A1 | 2/2017 | Ziezold |
| 2017/0039870 | A1 | 2/2017 | Ellis |
| 2017/0146362 | A1 | 5/2017 | Bai |
| 2017/0307391 | A1 | 10/2017 | Mason et al. |
| 2018/0031380 | A1 | 2/2018 | Lee et al. |
| 2018/0079306 | A1 | 3/2018 | Kim et al. |
| 2018/0099564 | A1 | 4/2018 | Koebler |
| 2018/0113448 | A1 | 4/2018 | Nagda et al. |
| 2018/0186375 | A1 | 7/2018 | O Meachair et al. |
| 2018/0222478 | A1 | 8/2018 | Limbacher |
| 2018/0244270 | A1 | 8/2018 | Tudosie |
| 2018/0345885 | A1 | 12/2018 | Seger et al. |
| 2018/0356835 | A1 | 12/2018 | Gehring et al. |
| 2019/0017840 | A1 | 1/2019 | Okamoto et al. |
| 2019/0152474 | A1 | 5/2019 | Sogabe |
| 2019/0164451 | A1 | 5/2019 | Gaither et al. |
| 2019/0170527 | A1 | 6/2019 | Inoue et al. |
| 2019/0236959 | A1 | 8/2019 | Belapurkar et al. |
| 2019/0248359 | A1 * | 8/2019 | Miller ............... B60W 50/0097 |
| 2019/0283584 | A1 | 9/2019 | Koebler et al. |
| 2019/0359211 | A1 | 11/2019 | Matsumoto et al. |
| 2020/0108829 | A1 | 4/2020 | Bauer |
| 2020/0122588 | A1 | 4/2020 | Cserna et al. |
| 2020/0191588 | A1 | 6/2020 | Park |
| 2020/0361476 | A1 | 11/2020 | Gaither et al. |
| 2020/0391593 | A1 | 12/2020 | Lee et al. |
| 2021/0185608 | A1 | 6/2021 | Ali et al. |
| 2021/0192975 | A1 | 6/2021 | Spence et al. |
| 2021/0213948 | A1 | 7/2021 | Lahti et al. |
| 2021/0269029 | A1 | 9/2021 | Fendt |
| 2021/0294351 | A1 | 9/2021 | Wiberg |
| 2021/0387525 | A1 | 12/2021 | Gruenig |
| 2021/0403082 | A1 | 12/2021 | Funke et al. |
| 2022/0073070 | A1 | 3/2022 | Niewiadomski |
| 2022/0089024 | A1 | 3/2022 | Aoyama |
| 2022/0250543 | A1 | 8/2022 | Szczerba et al. |
| 2022/0299328 | A1 * | 9/2022 | Pankov ............. G08G 1/096833 |
| 2022/0363129 | A1 * | 11/2022 | Pankov ............... B60K 35/00 |
| 2022/0363130 | A1 * | 11/2022 | Pankov ............... B60K 35/29 |
| 2022/0363285 | A1 | 11/2022 | Pankov |
| 2022/0366740 | A1 | 11/2022 | Pankov |
| 2022/0371580 | A1 | 11/2022 | Kusumoto et al. |
| 2022/0373341 | A1 * | 11/2022 | Pankov ............... G01C 21/3407 |
| 2022/0373342 | A1 | 11/2022 | Pankov |
| 2022/0373343 | A1 | 11/2022 | Pankov |
| 2022/0373344 | A1 * | 11/2022 | Pankov ............... G08G 1/22 |
| 2023/0278422 | A1 | 9/2023 | Pankov |
| 2023/0280174 | A1 * | 9/2023 | Pankov ............... B60W 40/06 |
| | | | 701/123 |
| 2024/0012154 | A1 * | 1/2024 | Gum ............... G01S 19/48 |
| 2024/0183675 | A1 * | 6/2024 | Pankov ............... G01C 21/3492 |
| 2024/0328796 | A1 * | 10/2024 | Pankov ............... B60W 30/182 |
| 2024/0328798 | A1 * | 10/2024 | Pankov ............... B60K 31/00 |
| 2024/0385002 | A1 * | 11/2024 | Pankov ............... G07C 5/02 |
| 2024/0393122 | A1 * | 11/2024 | Pankov ............. G01C 21/3469 |
| 2024/0401959 | A1 * | 12/2024 | Pankov ............. G01C 21/3492 |

FOREIGN PATENT DOCUMENTS

| | | |
|---|---|---|
| EP | 2614997 | 7/2013 |
| FR | 2811440 | 1/2002 |
| JP | 2001124575 | 5/2001 |
| JP | 2012208829 | 10/2012 |
| JP | 2015132613 | 7/2015 |
| KR | 101526431 | 6/2015 |
| RU | 2407060 | 8/2009 |
| RU | 2436163 | 7/2010 |

(56) References Cited

FOREIGN PATENT DOCUMENTS

| | | |
|---|---|---|
| RU | 2523192 | 1/2013 |
| RU | 2548649 | 10/2014 |
| RU | 2015103750 | 8/2016 |
| RU | 2681506 | 3/2019 |
| RU | 2741818 | 1/2021 |
| RU | 2764469 | 1/2022 |
| RU | 2764741 | 1/2022 |
| RU | 2765268 | 1/2022 |
| WO | 2010074668 | 7/2010 |
| WO | 2012039405 | 3/2012 |

OTHER PUBLICATIONS

Egor Kulik et al.: ""Estimation of the requirements for hybrid electric powertrain based on analysis of vehicle trajectory using GPS and accelerometer data"", 2018: https://ieeexplore.ieee.org/abstract/document/8321394.
Camiel J.J.Beckers et al.: ""Assessing the impact of cornering losses on the energy consumption of electric city buses"", 2020, https://www.sciencedirect.com/science/article/pii/S1361920920305472.
Irfan Ullah et al.: ""Electric vehicle energy consumption prediction using stacked generalization: an ensemble learning approach"", Feb. 26, 2021, https://www.tandfonline.com/doi/abs/10.1080/15435075.2021.1881902.
Bozorgi Amier et al.: ""A Time and Energy Efficient Routing Algorithm for Electric Vehicles Based on Historical Driving Data"", Nov. 2017, https://www.researchgate.net/publication/320953773_A_Time_and_Energy_Efficient_Routing_Algorithm_for_Electric_Vehicles_Based_on_Historical_Driving_Data.
Various Search Reports from the Russian Federal Institute of Industrial Property (with English translations).
International Search Report for PCT/RU2020/050189.
International Search Report for PCT/RU2022/050064.
International Search Report for PCT/RU2022/050065.
International Search Report for PCT/RU2022/050066.
International Search Report for PCT/RU2022/050067.
International Search Report for PCT/RU2022/050110.
International Search Report for PCT/RU2022/050111.
International Search Report for PCT/RU2022/050112.
International Search Report for PCT/RU2022/050113.
International Search Report for PCT/RU2022/050125.
International Search Report for PCT/RU2022/050126.
International Search Report for PCT/RU2022/050176.
International Search Report for PCT/RU2022/050221.
International Search Report for PCT/RU2022/050234.
International Search Report for PCT/RU2022/050241.
International Search Report for PCT/RU2022/050242.
International Search Report for PCT/RU2022/050245.
International Search Report for PCT/RU2022/050246.
International Search Report for PCT/RU2022/050294.
International Search Report for PCT/RU2022/050295.
International Search Report for PCT/RU2022/050360.
International Search Report for PCT/RU2022/050361.
International Search Report for PCT/RU2022/050362.
International Search Report for PCT/RU2022/050363.
International Search Report for PCT/RU2022/050364.
International Search Report for PCT/RU2022/050399.
International Search Report for PCT/RU2022/050400.
International Search Report for PCT/RU2022/050401.
International Search Report for PCT/RU2022/050402.
Written Opinion of the International Searching Authority for PCT/RU2020/050189 (English translation).
Written Opinion of the International Searching Authority for PCT/RU2022/050064.
Written Opinion of the International Searching Authority for PCT/RU2022/050065.
Written Opinion of the International Searching Authority for PCT/RU2022/050066.
Written Opinion of the International Searching Authority for PCT/RU2022/050067.
Written Opinion of the International Searching Authority for PCT/RU2022/0500110.
Written Opinion of the International Searching Authority for PCT/RU2022/0500111.
Written Opinion of the International Searching Authority for PCT/RU2022/0500112.
Written Opinion of the International Searching Authority for PCT/RU2022/0500113.
Written Opinion of the International Searching Authority for PCT/RU2022/0500125.
Written Opinion of the International Searching Authority for PCT/RU2022/0500126.
Written Opinion of the International Searching Authority for PCT/RU2022/0500176.
Written Opinion of the International Searching Authority for PCT/RU2022/0500221.
Written Opinion of the International Searching Authority for PCT/RU2022/0500234.
Written Opinion of the International Searching Authority for PCT/RU2022/0500241.
Written Opinion of the International Searching Authority for PCT/RU2022/0500242.
Written Opinion of the International Searching Authority for PCT/RU2022/0500245.
Written Opinion of the International Searching Authority for PCT/RU2022/0500246.
Written Opinion of the International Searching Authority for PCT/RU2022/0500294.
Written Opinion of the International Searching Authority for PCT/RU2022/0500295.
Written Opinion of the International Searching Authority for PCT/RU2022/0500360.
Written Opinion of the International Searching Authority for PCT/RU2022/0500361.
Written Opinion of the International Searching Authority for PCT/RU2022/0500362.
Written Opinion of the International Searching Authority for PCT/RU2022/0500363.
Written Opinion of the International Searching Authority for PCT/RU2022/0500364.
Written Opinion of the International Searching Authority for PCT/RU2022/0500399.
Written Opinion of the International Searching Authority for PCT/RU2022/0500400.
Written Opinion of the International Searching Authority for PCT/RU2022/0500401.
Written Opinion of the International Searching Authority for PCT/RU2022/0500402.
European (EPO) Search Opinion for EP4026746.
Supplemental European (EPO) Search Report for EP4026746.
Gauthier, Porsche's Augmented Reality HUD Could Show The Ideal Racing Line and 'Ghost' Cars, Sep. 18, 2018, www.carscoops.com/2018/09/porches-augmented-reality-hud-show-ideal-racing-line-ghost-cars.
George, A Head-up Display For Your Car That Lets You Race Yourself, Oct. 27, 2014, www.wired.com/2014/10/hud-brings-ghost-cars-to-the-track.
GhostDash: Augmented Reality Ghost Car and HUD, Apr. 27, 2019, web.archive.org/web/20190427073619/https://www.kickstarter.com/projects/ghostdash/ghostdash-augmented-reality-ghost-car-and-hud.
Bozorgi, A Time and Energy Efficient Routing Algorithm for Electric Vehicles Based on Historical Driving Data, IEEE Transactions on Electric Vehicles, vol. 2 No. 4, Dec. 2017.
Office Action re U.S. Appl. No. 17/561,844, Sep. 27, 2024.
Office Action re U.S. Appl. No. 17/561,844, Sep. 26, 2023.
Office Action re U.S. Appl. No. 17/561,844, Mar. 25, 2024.
Office Action re U.S. Appl. No. 17/561,834, Mar. 21, 2024.
Office Action re U.S. Appl. No. 18/421,894, Apr. 9, 2024.
Office Action re U.S. Appl. No. 17/561,846, Jun. 15, 2023.
Office Action re U.S. Appl. No. 17/561,846, Jul. 12, 2024.

(56) References Cited

OTHER PUBLICATIONS

Office Action re U.S. Appl. No. 17/561,846, Dec. 20, 2023.
Office Action re U.S. Appl. No. 17/561,851, Jul. 8, 2024.
Office Action re U.S. Appl. No. 17/561,851, Sep. 6, 2023.
Office Action re U.S. Appl. No. 17/687,907, Apr. 19, 2023.
Office Action re U.S. Appl. No. 17/640,469, Apr. 19, 2023.
Office Action re U.S. Appl. No. 17/640,469, Sep. 26, 2023.
Office Action re U.S. Appl. No. 17/687,907, Sep. 26, 2023.
Office Action re U.S. Appl. No. 17/561,851, Dec. 17, 2024.

* cited by examiner

SYSTEM FOR GENERATING AN ENERGY-EFFICIENT TRACK FOR A MOTOR VEHICLE

FIELD OF INVENTION

The proposed invention relates to methods for controlling energy consumption by a motor vehicle and can be used in transportation industry.

BACKGROUND OF THE INVENTION

There is a known method for evaluating the fuel efficiency of a motor vehicle disclosed in patent KR101526431B1, published on Jun. 5, 2015 on 12 sheets (D1). The method of D1 is implemented by a device for evaluating the fuel efficiency of a motor vehicle, the device comprising: a data collection unit that collects data on driving, as well status and identification data of a plurality of motor vehicles, including the first motor vehicle; a driving index calculator that calculates driving indexes of each motor vehicle based on their driving data; a means for extracting an analogous group that extracts a group of motor vehicles, which are similar to the first motor vehicle, from a plurality of motor vehicles, based on their driving indexes and status data; a means for fuel efficiency evaluation that evaluates the fuel efficiency of the first motor vehicle based on its driving data and identification data in the analogous group; and a means for controlling a motor vehicle that controls the method of steering the motor vehicle or the method for improving the driving of the first motor vehicle, based on the fuel efficiency evaluation. According to the invention, the fuel efficiency of a motor vehicle can be evaluated with precision taking into account driver's habits and the current condition of the vehicle. In addition, the method of steering the motor vehicle and the driving mode based on the assessment of the vehicle's fuel are provided to the driver, so that he/she can improve his/her driving efficiency and the efficiency of steering the motor vehicle, as well as reduce the cost of vehicle maintenance.

The method disclosed in D1 does not use the information on the specific portion of the route that was covered by the first motor vehicle, which reduces the accuracy of fuel consumption estimation. In addition, the method disclosed in D1 uses the information obtained from motor vehicles with similar specifications and similar driving mode only, which prevents the method from being used in a global fuel consumption control system comprising multiple motor vehicles with different specifications. The method disclosed in D1 can be considered the closest prior art to the claimed invention. In addition, the known invention of D1 does not provide a convenient graphical user interface that is adapted to inform the user of the need to change the mode of movement, or the steps of the method being performed.

BRIEF SUMMARY OF THE INVENTION

The technical problem to be solved by the claimed invention is to provide a method, a device and a system that do not possess the drawbacks of the prior art and thus make it possible to generate an accurate energy-efficient track for a motor vehicle that allows to reduce energy consumption by the motor vehicle on the specific portion of the route.

The objective of the claimed invention is to overcome the drawbacks of the prior art and thus to reduce energy consumption by the motor vehicle on the specific portion of the route.

The objective of the present invention is achieved by a system for generating an energy-efficient track for a motor vehicle, the system comprising at least: a server comprising at least: a CPU; a memory that stores the program code that, when implemented, induces the CPU to perform the steps according to the method for generating an energy-efficient track for a motor vehicle, that is performed by the computer's CPU, the method comprising at least the following steps: collecting primary data, which involves obtaining data associated with the first motor vehicle; data associated with the portion of the route to be passed by the first motor vehicle, and data associated with the second motor vehicle, wherein the second motor vehicle passes the portion of the route after the first motor vehicle; collecting secondary data, which involves generating a track for the first motor vehicle, wherein said track is generated based on how the first motor vehicle passed the portion of the route; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route; evaluating energy efficiency of the first motor vehicle on the passed portion of the route; the system further comprising at least: a motor vehicle comprising at least: a driving device and an engine that is connected to and actuates the driving device; a motion control system of the motor vehicle that is adapted to control the engine of the motor vehicle and is connected to the server, the motion control system comprising at least a transceiver adapted at least to receive the generated estimated track for the second motor vehicle.

BRIEF DESCRIPTION OF THE DRAWINGS

Exemplary embodiments of the present invention are described in further detail below with references made to the attached drawings, included herein by reference.

DETAILED DESCRIPTION OF THE INVENTION

According to a preferred embodiment of the present invention, there is provided a system for generating an energy-efficient track for a motor vehicle, the system comprising at least: a server comprising at least: a CPU; a memory that stores the program code that, when implemented, induces the CPU to perform the steps according to the method for generating an energy-efficient track for a motor vehicle, that is performed by the computer's CPU, the method comprising at least the following steps: collecting primary data, which involves obtaining data associated with the first motor vehicle; data associated with the portion of the route to be passed by the first motor vehicle, and data associated with the second motor vehicle, wherein the second motor vehicle passes the portion of the route after the first motor vehicle; collecting secondary data, which involves generating a track for the first motor vehicle, wherein said track is generated based on how the first motor vehicle passed the portion of the route; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route; evaluating energy efficiency of the first motor vehicle on the passed portion of the route; the system further comprising at least: a motor vehicle comprising at least: a driving device and an engine that is connected to and actuates the driving device; a motion control system of the motor vehicle that is adapted to control the engine of the motor vehicle and is connected to the server, the motion control system comprising at least a transceiver adapted at least to receive the generated estimated track for the second motor vehicle.

In an alternative embodiment of the present invention, there is provided the said system characterized in that wherein the data associated with the first motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof; and the data associated with the second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof.

In an alternative embodiment of the present invention, there is provided the said system characterized in that the estimated track for the second motor vehicle is generated using the data associated with the second motor vehicle and the data associated with the portion of the route to be passed by the second motor vehicle.

In an alternative embodiment of the present invention, there is provided the said system characterized in that the data associated with the portion of the route to be passed by the first motor vehicle include at least one of the data of the portion of the route that has been passed by the first motor vehicle, obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, or its infrastructure, and/or a combination thereof.

In an alternative embodiment of the present invention, there is provided the said system characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided the said system characterized in that the process of generating a track for the first motor vehicle further comprises the following steps: refining the primary data associated with the first motor vehicle based on how it passed the portion of the route; refining the primary data associated with the portion of the route based on how it was passed by the first motor vehicle; and the step of refining the primary data associated with the portion of the route is also based on the data obtained from the environmental sensors of the first motor vehicle.

In an alternative embodiment of the present invention, there is provided the said system characterized in that the primary data associated with the first motor vehicle and the primary data associated with the portion of the route form an estimated track for the first motor vehicle, wherein such estimated track further contains an estimated speed profile of the first motor vehicle; and the estimated track for the first motor vehicle contains estimated acceleration points and/or deceleration points on the portion of the road; and the track generated for the first motor vehicle further contains actual acceleration points and/or deceleration points determined based on how the first motor vehicle passed the given portion of the route; and the track generated for the first motor vehicle further contains the data on mismatches between the actual acceleration points and/or deceleration points and respective estimated acceleration points and/or deceleration points on the portion of the route; and the step of generating a track for the first motor vehicle further comprises a step of obtaining actual data on energy consumption by the first motor vehicle on the portion of the route; and the step of evaluating the energy efficiency of how the first motor vehicle passed the portion of the route involves comparing the estimated data on energy consumption by the first motor vehicle on the portion of the route with the actual data on energy consumption by the first motor vehicle on the portion of the route; and the estimated data on energy consumption by the first motor vehicle on the portion of the route are compared with the actual data on energy consumption by the first motor vehicle on the portion of the route taking into account the speed profile generated for the first motor vehicle.

In an alternative embodiment of the present invention, there is provided the said system characterized in that when the first motor vehicle is passing through the portion of the route, its actual speed profile is determined in at least one moment in time, and in case the actual speed profile of the first motor vehicle deviates from its estimated speed profile, an energy consumption control signal is generated for the first motor vehicle; and the energy consumption control signal for the first motor vehicle is a signal for the motion control system of the first motor vehicle and/or the on-board information system of the first motor vehicle, and this signal is a signal to decrease or increase the wheel speed of at least one wheel of the first motor vehicle.

In an alternative embodiment of the present invention, there is provided the said system, wherein when the second motor vehicle is passing the portion of the route that has been passed by the first motor vehicle, its actual speed profile is determined in at least one moment in time, and in case the actual speed profile of the second motor vehicle deviates from its estimated speed profile, which is a part of the estimated track for the second motor vehicle, an energy consumption control signal is generated for the second motor vehicle; and the energy consumption control signal for the second motor vehicle is a signal for the motion control system of the second motor vehicle and/or the on-board information system of the second motor vehicle, and this signal is a signal to decrease or increase the wheel speed of at least one wheel of the second motor vehicle.

Additional alternative embodiments of the present invention are provided below. This disclosure is in no way limiting to the scope of protection granted by the present patent. Rather, it should be noted that the claimed invention can be implemented in different ways, so as to include different components and conditions, or combinations thereof, which are similar to the components and conditions disclosed herein, in combination with other existing and future technologies.

Figure 1:
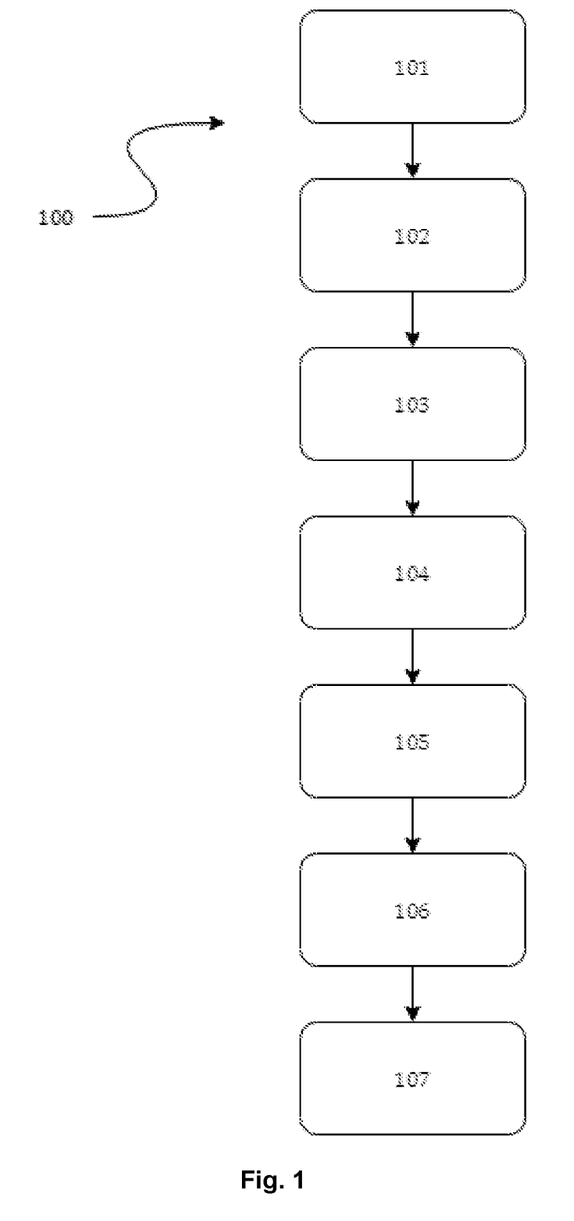
FIG. 1 illustrates an exemplary, non-limiting, diagram for the method 100 for generating an energy-efficient track for the motor vehicle.

FIG. 1 illustrates an exemplary, non-limiting, diagram for the method 100 for generating an energy-efficient track for the motor vehicle. Preferably, but not limited to, the method 100 comprises the following steps: an optional step 101 of generating an estimated track for the first motor vehicle; an optional step 102 of adjusting the estimated track for the first motor vehicle; a step 103 of evaluating the passing of a portion of the route by the first motor vehicle; a step 104 of generating an estimated track for a motor vehicle; an optional step 105 of adjusting the estimated track for a motor vehicle; an optional step 106 of evaluating the passing of a portion of the route by a motor vehicle; an optional step 107 of generating a track database. Preferably, but not limited to, the motor vehicle is any conventional motor vehicle, such as, but not limited to, a wheeled vehicle or a tracked vehicle, wherein the vehicle has to comprise at least one engine that consumes energy to actuate at least one moving device of the vehicle, such as, but not limited to, the wheels. The energy consumed by the engine is, for example, but not limited to, the energy produced by burning a fuel (in case the motor vehicle is equipped with an internal combustion engine), by electricity (in case the motor vehicle is equipped with an electric motor), or by a combination thereof (in case the motor vehicle is a hybrid vehicle). The first motor vehicle is a motor vehicle that passes the portion of the route first. The second motor vehicle is a motor vehicle that passes portion of the route later than the first motor vehicle. In addition, such vehicles are equipped with at least one transceiver used for data exchange with the server of the claimed system. Such a transceiver may be in communication with, but not limited to, a vehicle traffic control system and/or an on-board information system of the vehicle. At the same time, the mentioned motion control system can be used to change the operation of the engine, and/or the braking system of the vehicle, and/or other technical means in response to data received from the server of the claimed system, and the mentioned on-board information system can be used to notify the operator of the vehicle about the need to change the operation of the engine, and/or the braking system of the vehicle, and/or other technical means in response to similar data. At the same time, it should be obvious to a person skilled in the art that these systems can be used both separately and in combination, and certain functions of these systems can be inherent in each other. Preferably, but not limited to, the portion of the route is a portion of the route with special properties. A route is, but not limited to, a strip of land adapted to be passable by motor vehicles, wherein the route may comprise, but not limited to, a road, a junction, an intersection, etc. A road may be, but not limited to, a paved road or a dirt road. Preferably, but not limited to, the special properties of the portion of the route may comprise at least one of the following: the geometry of the portion of the route, the road grade of the portion of the route, the allowed speed on the portion of the route, the quality of road surface of the portion of the route, speed limits on the portion of the route, turns on the portion of the route, weather conditions on the portion of the route at the moment it is passed by a motor vehicle, the infrastructure of the portion of the road, or a combination thereof. For example, but not limited to, the special properties of the portion of the route may be marked by acceleration points and/or deceleration points. In addition, but not limited to, a deceleration point may be a point on the portion of the route, in which the momentum of the motor vehicle is sufficient to cover the distance to an acceleration point on the portion of the route. In addition, but not limited to, a deceleration point may be a point on the portion of the route, in which the motor vehicle has to be given negative or zero acceleration in order to smoothly reach the acceleration point, wherein the negative acceleration may be such that the motor vehicle has zero momentum at the acceleration point. In addition, but not limited to, an acceleration point may be a point on the portion of the route, in which the motor vehicle continues to move with negative acceleration. In addition, but not limited to, an acceleration point may be a point on the portion of the route, in which the motor vehicle has zero momentum. For example, but not limited to, a portion of the route may comprise a road with a slope and an upslope that follows it, wherein the beginning of the slope may be marked by a deceleration point, and an acceleration point may be placed within the upslope.

Figure 2:
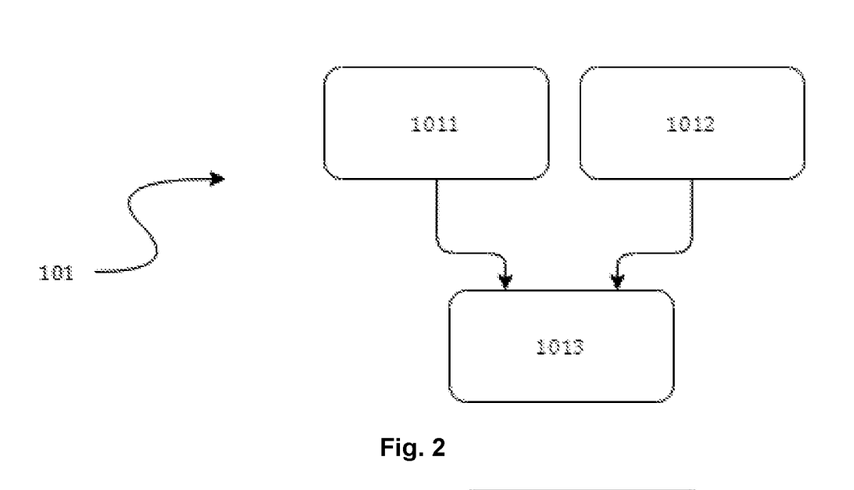
FIG. 2 illustrates an exemplary, non-limiting, diagram for the step 101 of generating an estimated track for the first motor vehicle.

As shown in FIG. 2, the optional step 101 of generating an estimated track for the first motor vehicle, for example, but not limited to, comprises the following steps: a step 1011 of identifying the first motor vehicle; a step 1012 of identifying the portion of the route; and a step 1013 of generating an estimated track for the first motor vehicle. For example, but not limited to, the step 1011 involves determining the first motor vehicle and the data associated with it. Such data may include, for example, but not limited to, at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof. In general, it should be noted that such data may be used to generate an estimated speed profile of the first motor vehicle on a given portion of the route. The step 1011 further involves determining the location of the first motor vehicle relative to the portion of the route that is identified in the step 1012. In addition, for example, but not limited to, the step 1012 involves determining the first portion of the route along the direction of movement of the first motor vehicle, relative to its location. The step 1012 further involves determining the special properties of the portion of the route, which are data associated with the portion of the route to be passed by the first motor vehicle. In general, it should be noted that the data about the special properties of the portion of the route may be used to generate an estimated speed profile of the first motor vehicle on this portion of the route. In addition, for example, but not limited to, the step 1013 involves generating an estimated track for the first motor vehicle on the portion of the route using the data associated with the first motor vehicle and the data associated with the portion of the route to be passed by the first motor vehicle. Therefore, the generated estimated track for the first motor vehicle contains both the data associated with the first motor vehicle and the data associated with the portion of the route to be passed by the first motor vehicle. Subsequently, the first motor vehicle moves along the given portion of the route in accordance with the estimated track for the first motor vehicle, wherein it is assumed that the estimated track is energy efficient. A motor vehicle track can be considered energy efficient in case both the time spent by the motor vehicle to pass the portion of the route and the energy consumed by the motor vehicle to pass the portion of the route are minimal. However, it should be obvious to a person having ordinary skill in the art that the estimated track for the first motor vehicle, generated in step 101, may be also generated using alternative ways.

Figure 3:
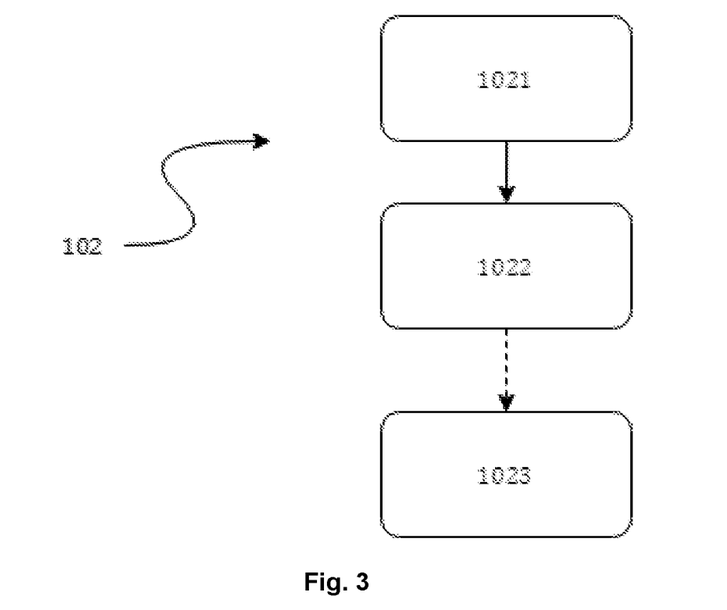
FIG. 3 illustrates an exemplary, non-limiting, diagram for the step 102 of adjusting the estimated track for the first motor vehicle.

As shown in FIG. 3, the optional step 102 of adjusting the estimated track for the first motor vehicle, for example, but not limited to, comprises the following steps: a step 1021 of determining the actual speed profile of the first motor vehicle in at least one of the moments when it passes the portion of the route; a step 1022 of comparing the actual speed profile with the corresponding estimated speed profile from the estimated track for the first motor vehicle; and, if necessary, a step 1023 of adjusting the actual speed profile in response to the results of said comparison. For example, but not limited to, the step 1021 involves determining the location of the first motor vehicle on the portion of the route, together with at least a single wheel speed of the first motor vehicle in the specified moment in time. In addition, for example, but not limited to, the step 1022 involves determining the estimated wheel speed of at least a single wheel of the first motor vehicle in the specified moment in time, as well as matching the actual wheel speed and the estimated wheel speed. In addition, for example, but not limited to, in case the actual wheel speed differs from the estimated wheel speed, an energy consumption control signal is generated for the first motor vehicle in step 1023. This energy consumption control signal, for example, but not limited to, contains a control signal for the motion control system of the first motor vehicle, which changes the operation of the engine, and/or the brake system, and/or other technical components of the first motor vehicle, so that the actual wheel speed matches the estimated wheel speed in the specified moment in time; and/or an alarm signal for the on-board information system of the first vehicle used to inform the operator of this vehicle about the need to change the operation of the engine, and/or the braking system of the first vehicle, and/or other technical means of the first vehicle in such a way that the said actual the speed of rotation of said wheel corresponded to the said calculated speed of rotation of said wheel at the said moment of time. However, it should be obvious to a person having ordinary skill in the art that although the adjustment of the estimated track for the first motor vehicle enhances the accuracy of the subsequent generation of the energy-efficient track for a motor vehicle thus allowing to reduce energy consumption by a motor vehicle on a specific portion of the route, said adjustment is optional, since the actual track of the first motor vehicle, which is generated according to the method described below, may be sufficient for generating an accurate energy-efficient track for a motor vehicle.

Figure 4:
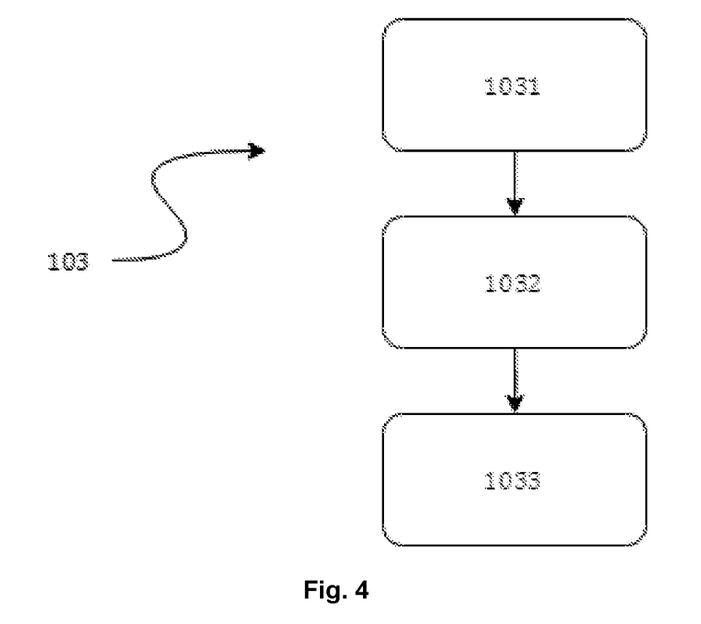
FIG. 4 illustrates an exemplary, non-limiting, diagram for the step 103 of evaluating the passing of a portion of the route by the first motor vehicle.

As shown in FIG. 4, the step 103 of evaluating the passing of a portion of the route by the first motor vehicle, which is also a step of collecting secondary data, comprises, but not limited to, the following steps: a step 1031 of collecting secondary data associated with the first motor vehicle and/or secondary data associated with the portion of the route passed by the first motor vehicle; a step 1032 of generating a track for the first motor vehicle; and a step 1033 of evaluating energy efficiency of the track of the first motor vehicle. For example, but not limited to, the step 1031 of collecting secondary data involves determining the fact of passing the portion of the route by the first motor vehicle, for example, but not limited to, based on the location of the first motor vehicle relative to the boundaries of the portion of the route, as well as (optionally) refining the data associated with the first motor vehicle and/or the portion of the route. In general, it should be noted that, in this step, the actual data associated with the first motor vehicle and/or the portion of the route it has passed are collected. In general, it should be noted that such data may be used to generate the actual track of the first motor vehicle, based on how it passed a given portion of the route. It should also be noted that refined data associated with the first motor vehicle and/or the portion of the route can be used to evaluate energy efficiency of the track generated for the first motor vehicle. In addition, for example, but not limited to, the step 1032 is the same as the step 1012, apart from the fact that the secondary data collected in step 1031 can be used to generate a track for the first motor vehicle along with the primary data associated with the first motor vehicle and/or the portion of the route. Thus, the actual track for the first motor vehicle generated in step 1032 also contains the actual data associated with the first motor vehicle, including, but not limited to, the actual speed profile of the first motor vehicle on the portion of the route and the actual data associated with the portion of the route. In addition, for example, but not limited to, the step 1033 involves evaluating energy efficiency of the track generated for the first motor vehicle. In general, it should be noted that the track generated for the first motor vehicle will be considered energy efficient in case both the time spent by the first motor vehicle to pass the portion of the route and the energy consumed by the first motor vehicle to pass the portion of the route are minimal. Thus, it should be noted that, in step 1033, energy efficiency of the estimated track for the first motor vehicle is compared to that of the track generated for the first motor vehicle. It should also be noted that in case the track generated for the first motor vehicle is more energy-efficient than the estimated track for the first motor vehicle, then the estimated track for a motor vehicle is generated using the generated (actual) track, even if it is different from the estimated track for the first motor vehicle. Otherwise, it should be noted that the estimated track for a motor vehicle is also generated based on the actual track for the first motor vehicle, taking into account the secondary data associated with the first motor vehicle and/or the portion of the route passed by it. In addition, the estimated track for the first motor vehicle can also be adjusted based on how the first motor vehicle passed the given portion of the route, using the refined data associated with the first motor vehicle and/or the portion of the route. In this case, energy efficiency of the adjusted estimated track for the first motor vehicle is evaluated. In general, it should be noted that the estimated track to be generated for a motor vehicle has to be energy efficient, and it has to be generated taking into account the properties of the actual track of the first motor vehicle. However, it should be obvious to a person having ordinary skill in the art that the estimated track for the first motor vehicle, as was mentioned above, can be any estimated track for the first motor vehicle that contains the data associated with the first motor vehicle and the data associated with the portion of the route to be passed by the first motor vehicle, including, but not limited to, the estimated track for the first motor vehicle that was adjusted in step 102.

Figure 5:
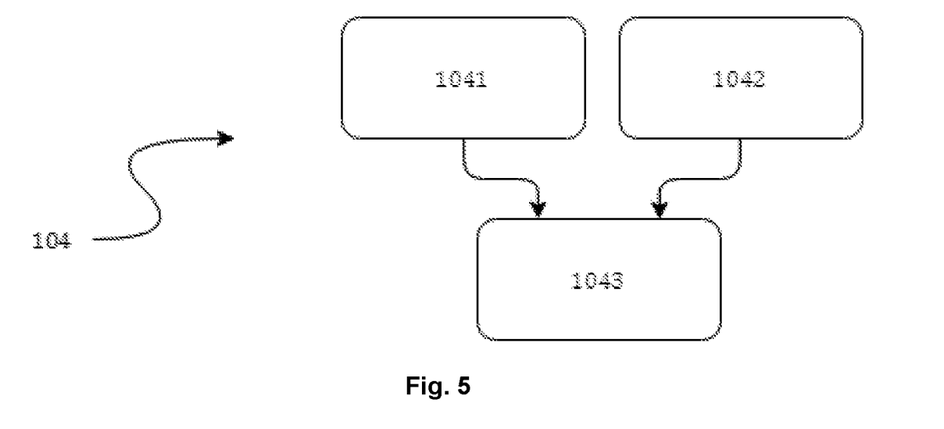
FIG. 5 illustrates an exemplary, non-limiting, diagram for the step 104 of generating an estimated track for the second motor vehicle.

As shown in FIG. 5, the step 104 of generating an estimated track for a motor vehicle comprises the following steps: a step 1041 of identification the first motor vehicle; a step 1042 of identifying the portion of the route; and a step 1043 of generating an estimated track for the first motor vehicle. For example, but not limited to, the step 1041 is the same as the step 1011, apart from the fact that the collected data associated with a motor vehicle are not the data associated with the first motor vehicle. In addition, for example, but not limited to, depending on the collected data associated with a motor vehicle, an additional adjustment coefficient, or any other normalization methods may be used, in case the data associated with a motor vehicle differ from any of the data associated with the first motor vehicle. In addition, for example, but not limited to, in the same step, the data of the portion of the route may also be refined, in case they can be refined without using the data from the track for the first motor vehicle, such as, but not limited to, weather data associated with the portion of the route, which will be relevant at the moment a motor vehicle passes the given portion of the route, as well as infrastructure data of the portion of the route. In general, it should be noted that the first motor vehicle and a motor vehicle are different, and therefore energy efficiency of their tracks on a given portion of the route should also be evaluated differently, preferably, but not limited to, in the way of adjusting their values relative to the normalized values. In addition, for example, but not limited to, the step 1042 is the same as the step 1012, apart from the fact that, when collecting the data associated with the portion of the route, the refined data associated with the portion of the route from the track generated for the first motor vehicle are also collected. In general, it should be noted that, in step 1042, the collected data associated with the portion of the route will be more accurate than the similar data from the estimated track for the first motor vehicle. In addition, for example, but not limited to, the step 1043 is the same as the step 1013, apart from the fact that the data from the track generated for the first motor vehicle are collected (and, optionally, normalized) along with the data associated with the first motor vehicle and/or the portion of the route, which are also collected and, optionally, normalized. In general, it should be noted that, in step 1043, there is generated an estimated track for a motor vehicle that takes into account both the properties of the portion of the route or the characteristics of a motor vehicle and how the first motor vehicle passed the portion of the route. In addition, but not limited to, the speed profile of a motor vehicle can be adjusted in advance based on the actual speed profile of the first motor vehicle, depending on the refined data associated with the portion of the route. More specifically, but not limited to, in step 1013, the properties of the portion of the route could not be considered with sufficient accuracy, since there were no actual data associated with the portion of the route, such as, but not limited to, the quality of pavement or temporary obstacles, and due to that fact the estimated track for the first motor vehicle could not possibly be energy efficient. In general, it should be noted that the estimated track for the first motor vehicle was generated using the data provided by the motor vehicle itself and external data sources only. However, but not limited to, based on how the first motor vehicle passed the given portion of the route, the track generated for the first motor vehicle can be significantly different from the estimated track for the first motor vehicle, for example, because the operator or the motion control system of the first motor vehicle were constantly assessing the situation on the portion of the route, which allowed the vehicle to pass it with higher energy efficiency than that of the estimated track, including by means of adjusting the estimated track. Thus, the estimated track generated for a motor vehicle has by any means, not necessarily due to normalization, higher energy efficiency than the estimated track for the first motor vehicle.

Figure 6:
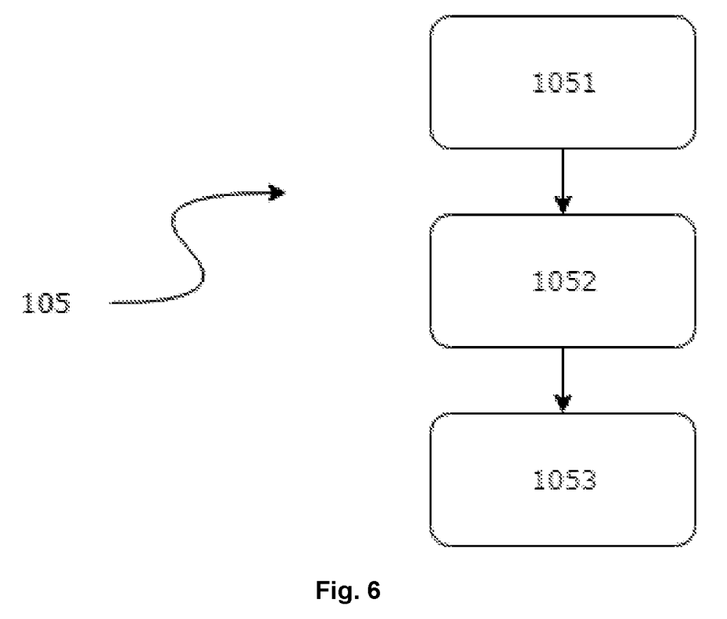
FIG. 6 illustrates an exemplary, non-limiting, diagram for the step 105 of adjusting the estimated track for the second motor vehicle.

As shown in FIG. 6, the optional step 105 of adjusting the estimated track for a motor vehicle, for example, but not limited to, comprises the following steps: a step 1051 of determining the actual speed profile of a motor vehicle in at least one of the moments when it passes the portion of the route; a step 1052 of comparing the actual speed profile with the corresponding estimated speed profile from the estimated track for a motor vehicle; and, if necessary, a step 1053 of adjusting the actual speed profile in response of a motor vehicle to the results of said comparison. For example, but not limited to, the step 1051 involves determining the location of a motor vehicle on the portion of the route, together with at least a single wheel speed of the second motor vehicle in the specified moment in time. In addition, for example, but not limited to, the step 1052 involves determining the estimated wheel speed of at least a single wheel of a motor vehicle in the specified moment in time, as well as matching the actual wheel speed and the estimated wheel speed. In addition, for example, but not limited to, in case the actual wheel speed differs from the estimated wheel speed, an energy consumption control signal is generated for the second motor vehicle in step 1053. This energy consumption control signal, for example, but not limited to, contains a control signal for the motion control system of the second motor vehicle, which changes the operation of the engine, and/or the brake system, and/or other technical components of the second motor vehicle, so that the actual wheel speed matches the estimated wheel speed in the specified moment in time; and/or an alarm signal for the on-board information system of the first vehicle used to inform the operator of this vehicle about the need to change the operation of the engine, and/or the braking system of the first vehicle, and/or other technical means of the first vehicle in such a way that the said actual the speed of rotation of said wheel corresponded to the said calculated speed of rotation of said wheel at the said moment of time. However, it should be obvious to a person having ordinary skill in the art that although the adjustment of the estimated track for a motor vehicle enhances the accuracy of the subsequent generation of the energy-efficient track for the following motor vehicles thus allowing to reduce energy consumption by the following motor vehicles on a specific portion of the route, said adjustment is optional, since the step 103 described above may be sufficient for generating accurate energy-efficient tracks for the following motor vehicles.

Figure 7:
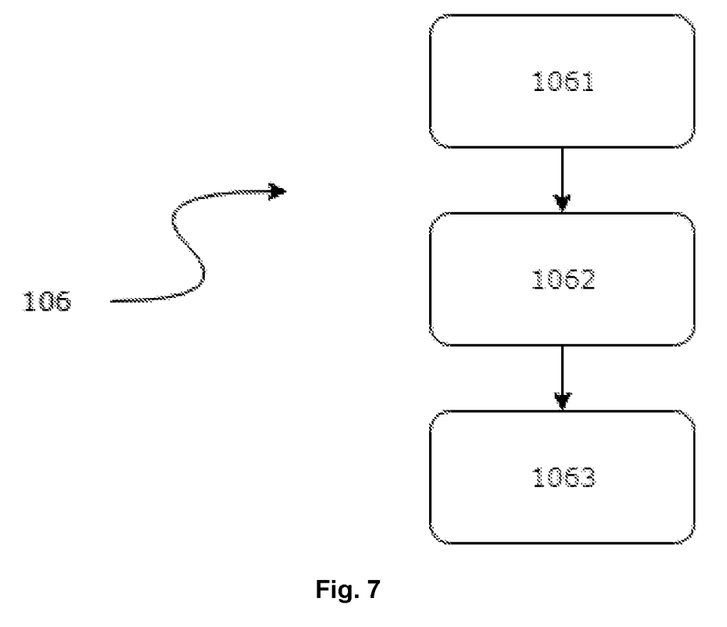
FIG. 7 illustrates an exemplary, non-limiting, diagram for the step 106 of evaluating the passing of a portion of the route by the second motor vehicle.

As shown in FIG. 7, the optional step 106 of evaluating the passing of a portion of the route by a motor vehicle involves, for example, but not limited to, the following steps: a step 1061 of collecting secondary data associated with a motor vehicle and/or secondary data associated with the portion of the route passed by a motor vehicle; a step 1062 of generating an actual track for a motor vehicle; and a step 1063 of evaluating energy efficiency of the track of a motor vehicle. For example, but not limited to, the step 1061 of collecting secondary data involves determining the fact of passing the portion of the route by a motor vehicle, for example, but not limited to, based on the location of a motor vehicle relative to the boundaries of the portion of the route and/or relative to the location of the first motor vehicle at the moment of determining the fact of passing, as well as (optionally) refining the data associated with a motor vehicle and/or the portion of the route. In general, it should be noted that, in this step, the actual data associated with a motor vehicle and/or the portion of the route it has passed are collected. In general, it should be noted that such data may be used to generate the actual track of a motor vehicle, based on how it passed a given portion of the route. It should also be noted that refined data associated with a motor vehicle and/or the portion of the route can be used to evaluate energy efficiency of the actual track generated for a motor vehicle. In addition, for example, but not limited to, the step 1062 is the same as the step 1032, apart from the fact that the secondary data collected in step 1061 can be used to generate the actual track for a motor vehicle along with the primary data associated with the first motor vehicle and/or the portion of the route, and along with the secondary data collected in step 1032. Thus, the actual track for a motor vehicle generated in step 1062 also contains the actual data associated with a motor vehicle, including the actual speed profile of a motor vehicle on the portion of the route and the actual data associated with the portion of the route, wherein these data may optionally be normalized relative to the data collected in step 1032. In addition, for example, but not limited to, the step 1063 involves evaluating energy efficiency of the track generated for a motor vehicle. In general, it should be noted that the track generated for a motor vehicle will be considered energy efficient in case both the time spent by a motor vehicle to pass the portion of the route and the energy consumed by a motor vehicle to pass the portion of the route are minimal. Thus, it should be noted that, in step 1063, energy efficiency of the estimated track for a motor vehicle is compared to that of the actual track generated for a motor vehicle. It should also be noted that in case the actual track for a motor vehicle is more energy-efficient than the estimated track for a motor vehicle, then the estimated track for any of the following motor vehicles is generated using the generated (actual) track for a motor vehicle, even if it is different from the estimated track for the first motor vehicle, wherein the following motor vehicle is any motor vehicle that is to pass the given portion of the route after a motor vehicle. Otherwise, it should be noted that the estimated track for the following motor vehicle is also generated based on the actual track for a motor vehicle, taking into account the secondary data associated with a motor vehicle and/or the portion of the route passed by it. In addition, the estimated track for a motor vehicle can also be adjusted based on how a motor vehicle passed the given portion of the route, using the refined data associated with a motor vehicle and/or the portion of the route. In this case, energy efficiency of the adjusted estimated track for a motor vehicle is evaluated. In general, it should be noted that the estimated track to be generated for the following motor vehicle has to be energy efficient, and it has to be generated taking into account the properties of the actual track of a motor vehicle. However, it should be obvious to a person having ordinary skill in the art that although the evaluation of how a motor vehicle passes a given portion of the route enhances the accuracy of the subsequent generation of the energy-efficient tracks for the following motor vehicles thus allowing to reduce energy consumption by these motor vehicles on a specific portion of the route, said evaluation is optional, since the aforementioned estimated track for a motor vehicle, or even the aforementioned estimated track for the first motor vehicle, may be sufficient for subsequent generation of a model energy-efficient track for any of the following motor vehicles.

The optional step 107 of generating a track database involves, for example, but not limited to, collecting a plurality of tracks of motor vehicles generated based on how these motor vehicles, i.e., at least the first motor vehicle and a motor vehicle, passed the portion of the route. For example, but not limited to, in step 107, the plurality of tracks of motor vehicles that have passed the portion of the route are collected. In addition, for example, but not limited to, in step 107, the collected tracks are systematized, so that these data can be used to generate a plurality of estimated tracks for the following motor vehicles. In addition, but not limited to, the plurality of such tracks can be used as an input for analysis, including by machine learning tools, in order to generate the most energy-efficient (model) track that would be suitable for any motor vehicle. Such model track can be unique for each motor vehicle and can subsequently be used as the estimated track for the first motor vehicle, whereupon the steps according to the method for generating an energy-efficient track will be performed again in order to generate a different model track for the same motor vehicle. In addition, but not limited to, such data can be used to change the properties of the portion of the route so as to ensure the generation of the most energy-efficient model track. However, it should be obvious to a person having ordinary skill in the art that although the forming of the track database enhances the accuracy of the subsequent generation of the energy-efficient tracks for the following motor vehicles thus allowing to reduce energy consumption by these motor vehicles on a specific portion of the route, said evaluation is optional, since the aforementioned estimated track for a motor vehicle, or even the aforementioned estimated track for the first motor vehicle, may be sufficient for subsequent generation of model energy-efficient tracks for the following motor vehicles.

Figure 8:
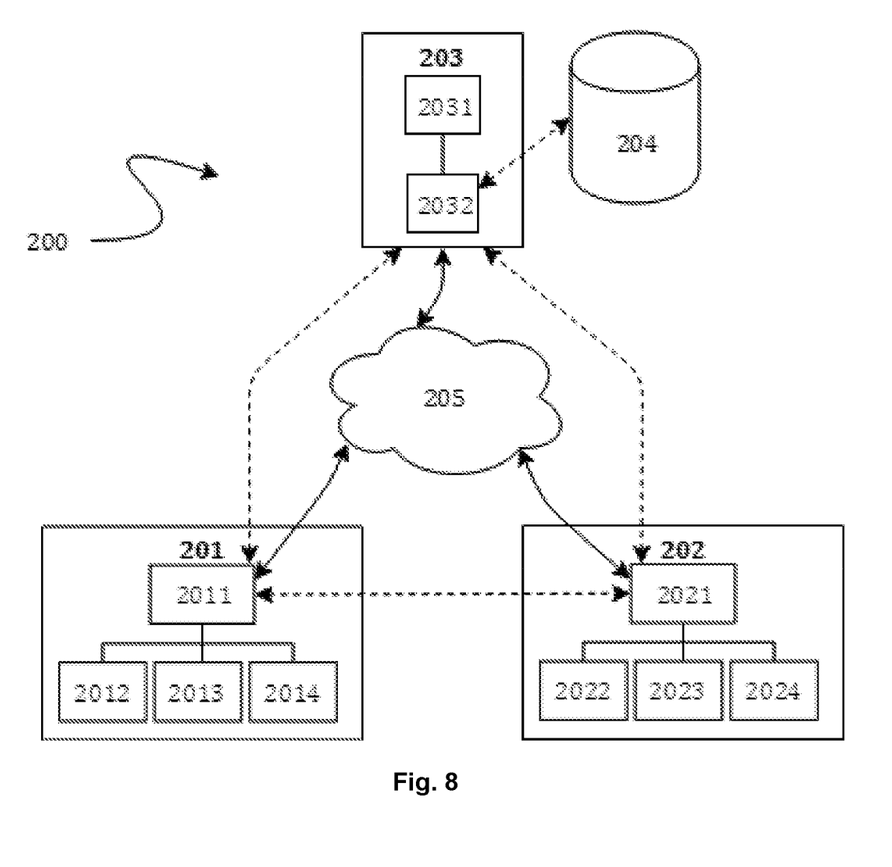
FIG. 8 illustrates an exemplary, non-limiting, diagram for the system 200 for generating an energy-efficient track for the motor vehicle.

FIG. 8 illustrates an exemplary, non-limiting, diagram for the system 200 for generating an energy-efficient track for the motor vehicle. For example, but not limited to, the claimed system 200 comprises the server 203 that communicates at least with the aforementioned transceivers 2011, 2021 of the first motor vehicle 201 and a motor vehicle 202, respectively. In addition, but not limited to, the server 203 is a computer device comprising at least a CPU 2031 and a memory 2032. In addition, but not limited to, the memory (computer-readable medium) of the server 203 contains the program code that, when implemented, induces the CPU to perform the steps according to the method for generating an energy-efficient track for the motor vehicle that was described above with reference to FIGS. 1-7. For example, but not limited to, the computer-readable medium (memory 2032) may comprise a random-access memory (RAM); a read-only memory (ROM); an electrically erasable programmable read-only memory (EEPROM); a flash drive or other memory technologies; a CD-ROM, a digital versatile disk (DVD) or other optical/holographic media; magnetic tapes, magnetic film, a hard disk drive or any other magnetic drive; and any other medium capable of storing and encoding the necessary information. In addition, but not limited to, the memory 2032 comprises a computer-readable medium based on the computer memory, either volatile or non-volatile, or a combination thereof. In addition, but not limited to, exemplary hardware devices include solid-state drives, hard disk drives, optical disk drives, etc. In addition, but not limited to, the computer-readable medium (memory 2032) is not a temporary memory (i.e., a permanent, non-transitive memory), and therefore it does not contain a temporary (transitive) signal. In addition, but not limited to, the memory 2032 may store an exemplary environment, wherein the procedure of generating an energy-efficient track for the motor vehicle may be implemented using computer-readable commands or codes that are stored in the memory of the server. In addition, but not limited to, the server 203 comprises one or more CPUs 2031 which are designed to execute computer-readable commands or codes that are stored in the memory 2032 of the device in order to implement the procedure of generating an energy-efficient track for the motor vehicle. In addition, but not limited to, the system 200 may further comprise a database 204. The database 204 may be, but not limited to, a hierarchical database, a network database, a relational database, an object database, an object-oriented database, an object-relational database, a spatial database, a combination of two or more said databases, etc. In addition, but not limited to, the database 204 stores the data to be analyzed in the memory 2032 or in the memory of a different computer device that communicates with the server 203, which may be, but not limited to, a memory that is similar to any of the memories 2032, as described above, and which can be accessed via the server 203. In addition, but not limited to, the database 204 stores the data comprising at least commands to perform the steps according to the method 100 as described above; the processed data associated with the first motor vehicle and/or a motor vehicle, and/or the portion of the route, including refined data; estimated and generated tracks for motor vehicles; navigational data; model tracks for motor vehicles; etc. In addition, but not limited to, the exemplary system 200 further comprises, respectively, at least the first vehicle 201 and a motor vehicle 202. Such vehicles 201, 202 usually comprise corresponding transceivers 2011, 2021 adapted to sending the data to the server 203 that communicates with motion control systems 2012, 2022 of respective vehicles and/or with on-board information systems 2013, 2023 (if present) of respective vehicles. Optionally, but not limited to, such motor vehicles may comprise various sensors 2014, 2024 to collect data that are associated with the corresponding motor vehicle in operation, and/or the portion of the route. In addition, but not limited to, the such sensors 2014, 2024 include a positioning sensor, speed sensors (such as, but not limited to, a crankshaft position sensor, a camshaft position sensor, a throttle position sensor, an accelerator pedal position sensor, a wheel speed sensor, a power consumption sensor, e.g. injection rate or current voltage characteristic), energy consumption sensors (such as, but not limited to, fuel level sensors, battery sensors, an accelerator pedal position sensor, injection rate sensor, and an RPM sensor), temperature sensors (such as, but not limited to, a coolant temperature sensor, an ambient temperature sensor, an in-car temperature sensor), pressure sensors (such as, but not limited to, an intake manifold pressure sensor, a fuel injection pressure sensor, a tyre pressure sensor), environmental sensors (such as, but not limited to, a light level sensor, a rain sensor, a radar, a lidar, a video camera, a sonar). In addition, but not limited to, there is provided a server 203, which, in addition to the functions mentioned above, stores and facilitates the execution of computer-readable commands and codes disclosed herein, which, accordingly, won't be described again. In addition, but not limited to, the server 203, in addition to the functions mentioned above, is capable of controlling the data exchange in the system 200. In addition, but not limited to, data exchange within the system 200 is performed with the help of one or more data exchange networks 205. In addition, but not limited to, data exchange networks 205 may include, but not limited to, one or more local area networks (LAN) and/or wide area networks (WAN), or may be represented by the Internet or Intranet, or a virtual private network (VPN), or a combination thereof, etc. In addition, but not limited to, the server 203 is further capable of providing a virtual computer environment for the components of the system to interact with each other. In addition, but not limited to, the network 205 provides interaction between transceivers 2011, 2021 on motor vehicles 201, 202, the server 203, and the database 204 (optionally). In addition, but not limited to, the server 203 and the database 204 may be connected directly using conventional wired or wireless communication means and methods, which, accordingly, are not described in further detail. In addition, but not limited to, the system 200 may optionally comprise infrastructure elements 206 of the portion of the route, specifically, various technical means capable of collecting the aforementioned data that are associated with motor vehicles and/or the portion of the route, and optionally can provide the aforementioned network 205 for data exchange on the portion of the route. For example, but not limited to, such elements 206 include a weather station, a speed monitoring camera, an infrastructural transceiver of the portion of the route, pavement weight sensors, etc. In addition, but not limited to, one of the aforementioned on-board information systems 2013, 2023, in case it is represented by a computer device comprising a CPU and a memory that are similar to the CPU 2031 and the memory 2032, may be represented by the aforementioned server 203 with its basic functions, wherein the aforementioned transceivers 2011, 2012 may be connected to each other by using any data exchange network or directly, via wireless communication, such as, but not limited to, radio communication, acoustic communication, infrared communication, laser communication, etc., wherein the database 204 may be implemented directly within the memory of one of the on-board information systems 2013 or 2023 (if present).

The present disclosure of the claimed invention demonstrates only certain exemplary embodiments of the invention, which by no means limit the scope of the claimed invention, meaning that it may be embodied in alternative forms that do not go beyond the scope of the present disclosure and which may be obvious to persons having ordinary skill in the art.

The invention claimed is:

1. A system for generating an energy-efficient track for a motor vehicle, the system comprising at least:
 a server comprising at least:
 a CPU; and
 a memory that stores program code that, when executed, induces the CPU to perform the following steps:
 collecting primary data, which involves obtaining data associated with a first motor vehicle; data associated with a portion of a route to be passed by the first motor vehicle, and data associated with a second motor vehicle, wherein the second motor vehicle passes the portion of the route after the first motor vehicle;
 collecting secondary data, which involves generating a track for the first motor vehicle, wherein said track is generated based on how the first motor vehicle passed the portion of the route;
 generating an estimated track for the second motor vehicle, wherein said estimated track is generated based on the track generated for the first motor vehicle;

wherein the track for the first motor vehicle is generated by performing the following steps:
  generating a speed profile of the first motor vehicle on the passed portion of the route;
  evaluating energy efficiency of the first motor vehicle on the passed portion of the route;
the system further comprising at least:
a motor vehicle comprising at least:
a driving device and an engine that is connected to and actuates the driving device;
a motion control system of the motor vehicle that is adapted to control the engine of the motor vehicle and is connected to the server, the motion control system comprising at least a transceiver adapted at least to receive the generated estimated track for the second motor vehicle;
wherein when the first motor vehicle is passing through the portion of the route, its actual speed profile is determined in at least one moment in time, and when the actual speed profile of the first motor vehicle deviates from its estimated speed profile, which is a part of said track for the first motor vehicle, an energy consumption control signal is generated for the first motor vehicle; and the energy consumption control signal for the first motor vehicle is a signal for a motion control system of the first motor vehicle and/or an on-board information system of the first motor vehicle, and this signal is a signal to decrease or increase wheel speed of at least one wheel of the first motor vehicle.

2. The system of claim 1, wherein the data associated with the first motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof; and the data associated with the second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof.

3. The system of claim 2, wherein the estimated track for the second motor vehicle is generated using the data associated with the second motor vehicle and a data associated with the portion of the route to be passed by the second motor vehicle.

4. The system of claim 1, wherein the data associated with the portion of the route to be passed by the first motor vehicle include at least one of the data of the portion of the route that has been passed by the first motor vehicle, obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, or its infrastructure, and/or a combination thereof.

5. The system of claim 1, wherein the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

6. The system of claim 1, wherein the process of generating a track for the first motor vehicle further comprises the following steps:
  refining the primary data associated with the first motor vehicle based on how it passed the portion of the route;
  refining the primary data associated with the portion of the route based on how it was passed by the first motor vehicle;
  and the step of refining the primary data associated with the portion of the route is also based on data obtained from environmental sensors of the first motor vehicle.

7. A system for generating an energy-efficient track for a motor vehicle, the system comprising at least:
a server comprising at least:
a CPU; and
a memory that stores program code that, when executed, induces the CPU to perform the following steps:
collecting primary data, which involves obtaining data associated with a first motor vehicle; data associated with a portion of a route to be passed by the first motor vehicle, and data associated with a second motor vehicle, wherein the second motor vehicle passes the portion of the route after the first motor vehicle;
collecting secondary data, which involves generating a track for the first motor vehicle, wherein said track is generated based on how the first motor vehicle passed the portion of the route;
generating an estimated track for the second motor vehicle, wherein said estimated track is generated based on the track generated for the first motor vehicle;
wherein the track for the first motor vehicle is generated by performing the following steps:
  generating a speed profile of the first motor vehicle on the passed portion of the route;
  evaluating energy efficiency of the first motor vehicle on the passed portion of the route;
the system further comprising at least:
a motor vehicle comprising at least:
a driving device and an engine that is connected to and actuates the driving device;
a motion control system of the motor vehicle that is adapted to control the engine of the motor vehicle and is connected to the server, the motion control system comprising at least a transceiver adapted at least to receive the generated estimated track for the second motor vehicle;
wherein when the second motor vehicle is passing the portion of the route that has been passed by the first motor vehicle, its actual speed profile is determined in at least one moment in time, and when the actual speed profile of the second motor vehicle deviates from its estimated speed profile, which is a part of the estimated track for the second motor vehicle, an energy consumption control signal is generated for the second motor vehicle;
and the energy consumption control signal for the second motor vehicle is a signal for a motion control system of the second motor vehicle and/or an on-board information system of the second motor vehicle, and this signal is a signal to decrease or increase wheel speed of at least one wheel of the second motor vehicle.

8. A system for generating an energy-efficient track for a motor vehicle, the system comprising at least:

a server comprising at least:
a CPU; and
a memory that stores program code that, when executed, induces the CPU to perform the following steps:
collecting primary data, which involves obtaining data associated with a first motor vehicle; data associated with a portion of a route to be passed by the first motor vehicle, and data associated with a second motor vehicle, wherein the second motor vehicle passes the portion of the route after the first motor vehicle;
collecting secondary data, which involves generating a track for the first motor vehicle, wherein said track is generated based on how the first motor vehicle passed the portion of the route;
generating an estimated track for the second motor vehicle, wherein said estimated track is generated based on the track generated for the first motor vehicle;
wherein the track for the first motor vehicle is generated by performing the following steps:
    generating a speed profile of the first motor vehicle on the passed portion of the route;
    evaluating energy efficiency of the first motor vehicle on the passed portion of the route;
the system further comprising at least:
a motor vehicle comprising at least:
a driving device and an engine that is connected to and actuates the driving device;
a motion control system of the motor vehicle that is adapted to control the engine of the motor vehicle and is connected to the server, the motion control system comprising at least a transceiver adapted at least to receive the generated estimated track for the second motor vehicle;
wherein the primary data associated with the first motor vehicle and the primary data associated with the portion of the route form an estimated track for the first motor vehicle, wherein such estimated track further contains an estimated speed profile of the first motor vehicle; and the estimated track for the first motor vehicle contains estimated acceleration points and/or deceleration points on the portion of the route; and the track generated for the first motor vehicle further contains actual acceleration points and/or deceleration points determined based on how the first motor vehicle passed the given portion of the route; and
the track generated for the first motor vehicle further contains data on mismatches between the actual acceleration points and/or deceleration points and respective estimated acceleration points and/or deceleration points on the portion of the route; and the step of generating a track for the first motor vehicle further comprises a step of obtaining actual data on energy consumption by the first motor vehicle on the portion of the route; and the step of evaluating the energy efficiency of how the first motor vehicle passed the portion of the route involves comparing the estimated data on energy consumption by the first motor vehicle on the portion of the route with the actual data on energy consumption by the first motor vehicle on the portion of the route; and the estimated data on energy consumption by the first motor vehicle on the portion of the route are compared with the actual data on energy consumption by the first motor vehicle on the portion of the route taking into account the speed profile generated for the first motor vehicle.

* * * * *